United States Patent [19]

Masuda

[11] Patent Number: 4,743,508

[45] Date of Patent: May 10, 1988

[54] GRINDSTONE-POLYMER COMPOSITE FOR SUPER COLLOID MILL AND MANUFACTURING METHOD THEREOF

[76] Inventor: Tsuneo Masuda, No. 12-24, Hon-cho 1-chome, Kawaguchi-shi, Saitama-Ken, Japan

[21] Appl. No.: 840,172

[22] Filed: Mar. 17, 1986

[51] Int. Cl.[4] .................... B32B 9/00

[52] U.S. Cl. .................... 428/408; 428/540; 51/293

[58] Field of Search .................... 427/238, 294, 393.6, 427/299, 443.2; 428/540, 610, 408; 51/293

[56] References Cited

U.S. PATENT DOCUMENTS

| | | | |
|---|---|---|---|
| 2,684,307 | 7/1954 | Knapman et al. | 427/294 X |
| 3,172,775 | 3/1965 | Shaines | 427/393.6 X |
| 3,216,854 | 11/1965 | Halverstadt et al. | 427/294 X |
| 3,650,804 | 3/1972 | Parisi | 29/530 |
| 4,013,809 | 3/1977 | Marocco | 427/430.1 X |
| 4,125,637 | 11/1978 | Tanner | 51/318 X |
| 4,196,231 | 4/1980 | Hubers | 427/430.1 X |
| 4,500,568 | 2/1985 | Pearson et al. | 427/294 |
| 4,539,233 | 9/1985 | Melotik et al. | 427/388.1 |

*Primary Examiner*—Thurman K. Page
*Attorney, Agent, or Firm*—Armstrong, Nikaido, Marmelstein & Kubovcik

[57] ABSTRACT

A grindstone-polymer composite for a super colloid mill characterized in that, in the inner void pores of the porous vitrified grindstone for the super colloid mill, thermoplastic and thermosetting polymers are allowed to fill the void pores of the wall surface within a range of 30 to 60% of total volume of void pores in said grindstone so that 70 to 40% of void pores in the grindstone for the super colloid mill remain and the volume fraction Vp thereof lies within a range of 0.09 to 0.21.

3 Claims, 3 Drawing Sheets

FIG. 3a
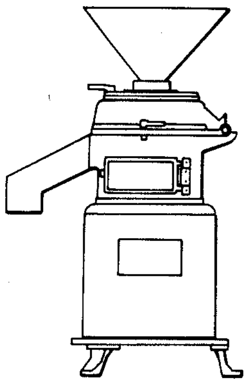
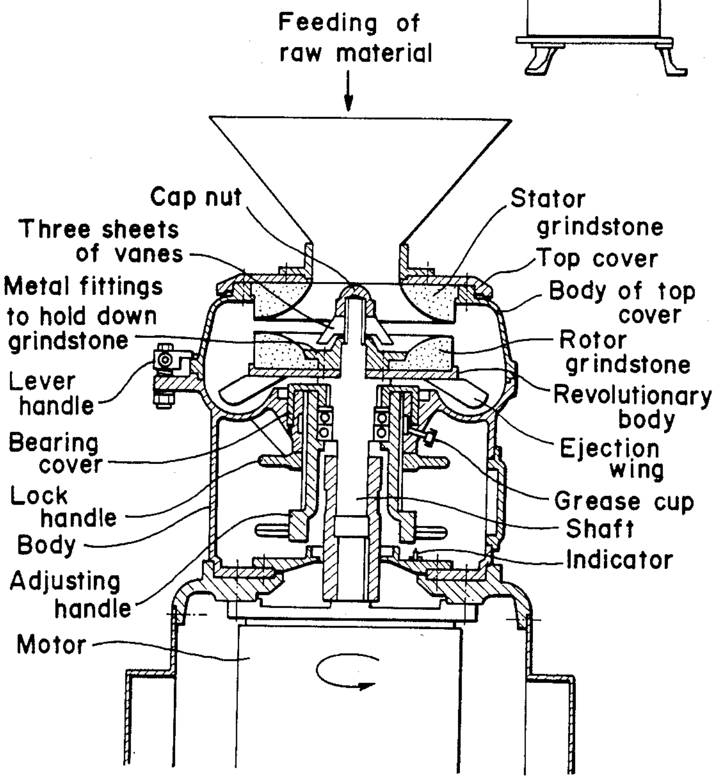
FIG. 3b

F I G . 4a
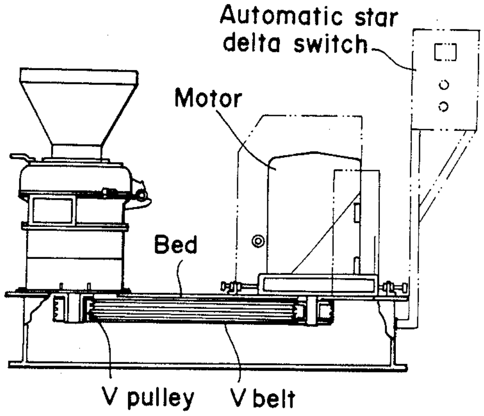
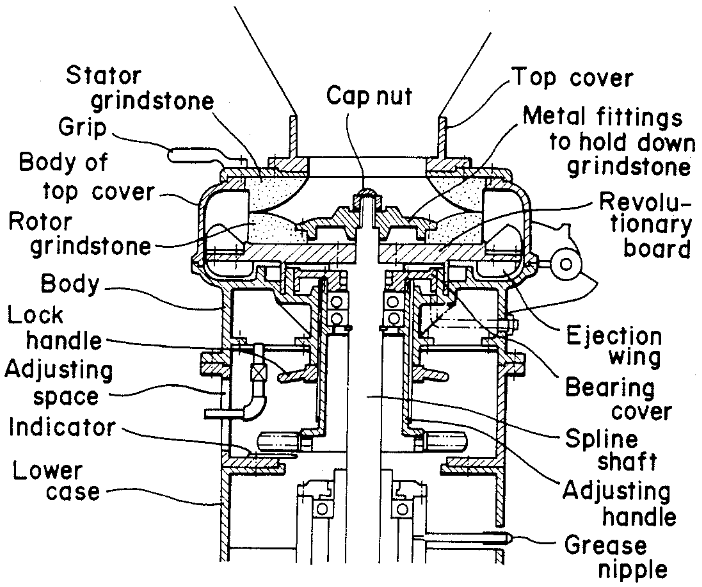
F I G . 4b

GRINDSTONE-POLYMER COMPOSITE FOR SUPER COLLOID MILL AND MANUFACTURING METHOD THEREOF

DETAILED DESCRIPTION OF THE INVENTION

The present invention relates to a grindstone-polymer composite for a super colloid mill and a manufacturing method thereof.

As one of the exploitations of unused resources, the supply of bony parts of chickens, pigs and cattles, further offals of fishes, etc. to the market as the paste meats with no taste on the tongue, fine pulverization of beans and crops, and super fine pulverization of other raw materials for the industry have become exploiting problems of importance.

At present, various pulverizers are available in the market, and, as one of them, the super colloid mill (liquefiable milling machine) is used preferably in the industry.

As an example thereof, description is made about Mass-colloider (trade name) which can be said to be a representative of the super colloid mill. This machine is composed of two pieces, upper and lower grinders, the space between them being possible to be adjusted freely. The upper grinder is fixed, and strong centrifugal force, impact milling and shear are created between it and lower grinder revolving at high speed. The super fine pulverization is realized by the overall actions thereof. As the grindstone materials to be used therefor, appropriate hardness and toughness are required.

Explaining the performance of conventional vitrified grinder (grindstone) using aforementioned Masscolloider as an example, the raw materials thrown into the hopper are first fed to the clearance between two pieces of upper and lower grinders by means of the impact and the centrifugal force created by the impeller at the tip portion of shaft and the lower grinder revolving at high speed, and are subjected to strong shear, compression and milling force caused thereby. As a result, they are super finely pulverized gradually and discharged thereafter.

Here, the life of the super colloid mill is to be the vitrified grinder. But, the greatest defect thereof is that there occurs easily the damage(destruction) of grinder, which might be connected with an accident if in operation, through the deformation due to the thermal expansion resulting from the uneven distribution of the heat of friction. The reason why conventional grinder necessitates the appropriate toughness lies here.

In the case of using materials of high hardness or dried matters as the pulverizing raw materials, the heat of friction of grinder becomes particularly high and is apt to cause the damage(destruction). If the clearance between the grinders widen is to avoid damage, fine pulverization becomes impossible. In order to solve the problem described above, various methods for improvement have been tried for many years, but the efforts do not come to the success.

If the damage(destruction) of grinder does not occur by the heat of friction as described above, the conventional method for fine pulverization might be changed completely, and the production capacity would be improved to a large extent. For example, up to this time, the number of revolutions has been reduced in order to suppress the occurrence of the heat of friction on grinder. Therefore, the decrease in the production was unavoidable. Moreover, for the reason described above, the manufacturers of vitrified grinder did not produced the grinder of large caliber for high-speed revolution, but if there is no anxiety for the damage(destruction), they would produce the vitrified grinder of large caliber to offer to the manufacturers of super colloid mill. As a result of this, if the diameter is increased, for example, by 50%, the production amount would be enhanced about 2.5 times. The most important matter is to be able to secure the safety in operation.

The advantages thereof are described below in detail showing concrete example. The vitrified grinder consists of three elements; grains, binder and connected pores. If the proteinaceous substances adhere to the pore portions which are one of the three big elements, rotting by unwanted bacteria will occur on these portions. Therefore, it is necessary to wash and to remove the adhered substances well with the metal bruch etc. at the time of use, but there are no means to wash ones adhered inside pores. Moreover, since the distribution of these pore portions is uneven, the expansion cracks are induced by the heat of friction. If possible to fill up these connected pores artificially with the substance having objective properties, it becomes also possible to use Borazon type etc., more excellent than Alundum type ($Al_2O_3$) and Carborundum type ($SiC$) for the grains supplied currently as the raw materials for the manufacture of grinder.

If the grindstone is manufactured using this Borazon type and the super colloid mill is made using this grindstone, milling of substances of high hardness, pulverization of dried matters and super fine pulverization also become possible, and the contribution to the industry of pulverization and super colloid milling is remarkable.

BRIEF DESCRIPTION OF THE DRAWING

FIGS. 3(A) and 3(B) and FIGS. 4(A) and 4(B) are illustration diagrams showing state wherein the polymer composite vitrified grinders of the invention are fitted up to super colloid mill as the stator grindstone and the rotor grindstone.

SUMMARY OF THE INVENTION

The invention provides the grindstone-polymer composite for super colloid mill characterized in that, in the inner void pores of the porous vitrified grindstone for super colloid mill, thermoplastic and thermosetting polymers are allowed to grow and to fill up the void pores of the wall surface within a range of 30 to 60% of total volume of void pores in said grindstone so that 70 to 40% of void pores in the grindstone for super colloid mill remain and the volume fraction Vp thereof to lie within a range of 0.09 to 0.21, and the manufacturing method of grindstone-polymer composite for super colloid mill characterized in that, into the inner void pores of the porous vitrified grindstone for super colloid mill, monomer or oligomer of thermoplastic type and thermosetting type plastics (synthetic resins) is injected forcedly under reduced or applied pressure, and, after the impregnated monomer is polycondensed in situ using heat energy, the surface finishing is carried out.

DETAILED DESCRIPTION OF THE INVENTION

As described above, the main points of the invention are that the grindstone-polymer composite for super colloid mill and the manufacturing method thereof have been found wherein, in the connected pores present in the constructive body of vitrified grinder, a fixed amount of thermoplastic polymer is allowed to fix and to be filled up from the wall surface of void pores toward the central portion of void pores.

With regard to the manufacturing technique of composite to allow polymer to be filled up in the void pores of solid materials, the details are published serially on Plastic Age for five months from September, 1978. But the technique to make vitrified grinder composite with polymer is not touched. Since the impact strength is lowered by allowing polymer to be filled up in whole connected pores of vitrified grinder, those are points of importance in which state and how much polymer is allowed to be formed in these pores.

Figure 1:
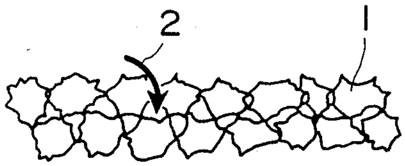
FIG. 1 is a schematic sectioned diagram of the conventional vitrified grinder.
Figure 2:
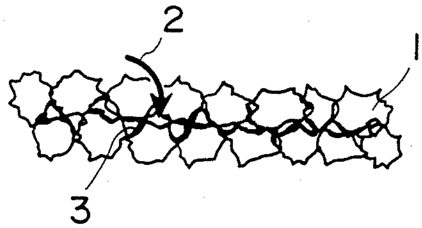
FIG. 2 is a schematic sectioned diagram of the vitrified grinder (polymer composite) of the invention.

Namely, as shown in the schematic sectioned diagram of FIG. 1, the section of conventional vitrified grinder has a porous structure, wherein the connected pores (2) lie between the grams (1) and, when water is poured on the surface of grinder, water penetrates instantaneously. In the invention, as shown in FIG. 2, raw material monomer of thermoplastic plastics is allowed to be impregnated into the connected void pores (2) along the wall surface thereof, this impregnated monomer to polymerize in situ and the thermoplastic polymer (3) to grow and to be filled up in order to make anticipated grindstone-polymer composite for super colloid mill.

In following, explanation is made using concrete example. The ratios of void pores in the stators and the rotors made from the grains of vitrified $Al_2O_3$ No. 46, No. 80 and No. 120 (hardness: T) are shown in Table 1.

TABLE 1

| Particle size of grains | Ratio of void pores (%) |
|---|---|
| No. 46 | 52 |
| No. 80 | 31 |
| No. 120 | 33 |

Taking the void pores shown in Table 1 as 100, about 40 to 60% and about 30 to 40% polymers to the volume of void pores are filled up in the surface layer and the inner part of the grindstone, respectively, so as the amounts of filled polymer to decrease from surface layer toward inner layer as a whole grindstone.

Although the concrete method therefor is described later, it become evident from experimental results that the gradient of polymer distribtuion could be attained by passing through the degasification process after the impregnation of vinyl monomer.

Next, explaining the manufacturing process in the invention, is is as shown in the following block diagram.

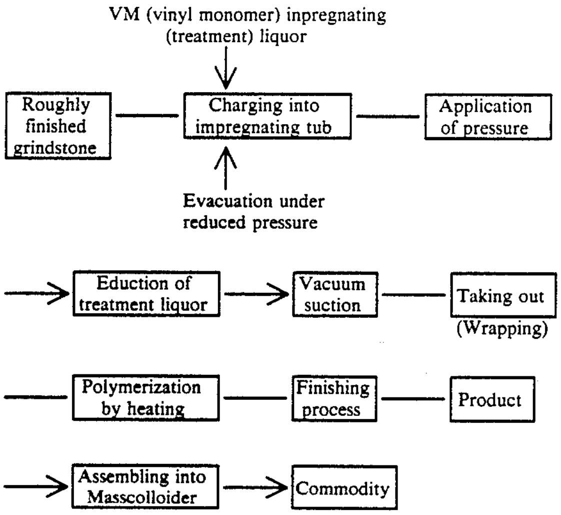

The manufacturing method is stated based on the above process diagram. At first, the grindstone is finished roughly in the shape usable for super colloid mill and, after measured the weight, it is placed in the impregnating tub which is then evacuated with vacuum pump. After a fixed amount of suction is carried out under reduced pressure in order to remove the air present in the void pores of grindstone, the previously formulated impregnant, for example, vinyl type monomer is introduced into the impregnating tub from storage tank through pipe. The treatment liquor is fed until the grindstone is submerged completely and thereafter the cock of pipe for vacuum suction is released. At this time, the level of liquor is pushed by the atmospheric pressure to introduce the treatment liquor into the void pores of grindstone.

After returned the level of liquor to normal pressure, the pipe for vacuum suction is connected to $N_2$ gas bomb with the coiled pipe and pressure is applied to the level of liquor in the impregnating tub. When reached to a gauge pressure of 20 $kg/cm^2$, the exit of $N_2$ bombe is closed to allow to stand for several hours in this state.

After elapsed a fixed period of time, the inside of the impregnating tub is returned to normal pressure and the treatment liquor in the tub is ejected completely. Thereafter, the mouth of vacuum suction is connected again to vacuum pump to conduct suction under reduced pressure. The distribution of the treatment liquor is adjusted in the grindstone by the pressure-reducing conditions and the period of time at this time and the treatment liquor becomes rich in the surface layer decreasing gradually toward the inner layer.

After returned to normal pressure again, the grindstone is taken out from the impregnating tub and wrapped well with cellophane. At this time, weight is measured to determine the amounts of treatment liquor impregnated into the grindstone.

Placing the grindstone impregnated with vinyl monomer and wrapped with cellophane in hot air-circulating polymerization tub heated beforehand at 60° to 70° C., the polymerization is initiated before and after 4 hours and the temperature inside the grindstone is elevated increasingly. After reached to nearly 160° C., the inner temperature is lowered gradually to become same as that inside the polymerization tub.

Having completed the polymerization at this state, the grindstone is taken out from the polymerization tub and the weight is measured. From the weight at the time of impregnation and that at the time of completion of polymerization, the conversion ratio of the treatment liquor and the formation ratio of polymer can be determined. Cellophane is taken off and the grindstone enters to the finishing process.

For the finish, diamond dresser is used. Water is poured on to the surface to place and moreover the outer circumference is fastened tight with metallic band. The finished product is fitted up to Masscolloider to make a commodity of super colloid mill. At this time, it is of importance to fit up the grindstone reducing the width each by several millimeters from both top and bottom.

Here, as a concrete example, a part of data obtained with the composite grindstone wherein methyl methacrylate (MMA) was impregnated into the grindstone No. 49 (stator and rotor) made by Clenorton Co. and polymerized thereafter is shown below by the volume fraction.

< No. 46 made by Clenorton Co. >

| Name of goods | Specific gravity | Ratio of formed polymer | Volume fraction of composite grindstone (%)* VM | VP | Vv |
|---|---|---|---|---|---|
| Stator | 2.36 | 13 (%) | 0.48 | 0.11 | 0.41 |
| Rotor | 2.36 | 10 | 0.48 | 0.09 | 0.43 |

*VM: Substantial part of grindstone, VP: Polymer filled in voids of grindstone, Vv: Remaining voids of composite grindstone Note: It is best to judge the characteristics of materials by the volume fraction of constituting elements of materials.

As the treatment liquors to be impregnated, vinyl type monomer and vinylidene type monomer are used independently or in combination ordinarily, but, in the case of aiming at the heat resistance, monomer or oligomer of polycarbonate, polyimide, etc. is used. As the polymerization initiators, all of the commercial products can be used, but preferably benzoic peroxide (BPO) or azobisisobutylnitrile (AIBN) is used and added in amount of less than 1% based on the weight of monomer.

EXAMPLE 1

Vitrified grindstone (grains: $Al_2O_3$) No. 46 made by Clenorton Co. (volume: 1652 $cm^3$, weight: 3900 g, specific gravity: 2.36, true specific gravity: 4.99) was evacuated under reduced pressure from a mouth at one side of the impregnating water tub by connecting to vacuum pump with thickwall rubber tube. Pressure was reduced to 10 mmHg by the suction for about 1 hour. The suction was continued further for 1 hour in this state and thereafter cock was closed. On the other hand, the liquor added 50 g of AIBM to 5 kg of MMA was prepared in a tub and MMA was introduced into the impregnating tub. Since inside of the impregnating tub was vacuum, MMA flowed through the pipe vigorously to enter into the tub. After completed MMA to enter into the tub, cock was opened to get normal pressure. The suction mouth for reducing pressure was connected to nitrogen gas bombe and, after closed all of cocks, $N_2$ gas was introduced to apply pressure to the level of liquor. When pressure valve of the impregnating tub indicated at 25 $Kg/cm^2$, the tub was allowed to stand for about 3 hours leaving the cocks close and keeping the state as it was. Then, cocks were opened to return the inside of the tub to normal pressure and the MMA treatment liquor was educed completely from the tub. All of cocks were closed again to evacuate under reduced pressure.

After returned the inside of the tub to about 100 mmHg, the suction was continued for about 30 minutes. At this time, cocks, were closed and the tub was allowed to stand still for 10 minutes. Thereafter, all of cocks were opened. The grindstone was taken out from the impregnating tub and the weight was measured. The weight was found to be 4625 g, so that MMA was impregnated in amounts of about 275 g.

The grindstone impregnated with MMA was wrapped threefold with cellophane and placed in the hot air-circulating polymerization tub heated beforehand at a set temperature 75° C. After elasped about 3 hours, heat was generated gradually and the inner central temperature reached to nearly 180° C. Then, the heat of polymerization was lowered gradually and equilibrated with the temperature in the polymerization tub. It took about 5 hours until the completion of polymerization after placed in the polymerization tub. The composite grindstone with polymer was taken out by opening the wrapping cellophane and the weight was measured to find to be 4480 g. Among 725 g of MMA impregnated as monomer, 580 g were converted to polymer with the conversion ratio of 80%.

To total weight, 580 g of MMA polymer corresponded to 13%. According to the calculation, 19.2% of the voids were to be filled on the average to those calculated from the true specific gravity. However, in specting the cross section with optical microscope, it was confirmed that polymer was rich in the surface layer and decreased gradually toward the inner part.

The remaining voids determined from the calculation were 80.8%. For the finish of this composite grindstone, diamond dresser was used and, pouring cold water onto the surface, planing was carried out. The outer circumference of the product was fastened tight with metallic band.

The product was fitted up to Masscolloider and, from the test of super colloid milling, excellent results were obtained.

EXAMPLE 2

Placing vitrified grindstone (grains: $Al_2O_3$) No. 46 made by Clenorton Co. (volume: 1749 $cm^3$, weight: 4130 g, specific gravity: 2.36, true specific gravity: 4.92) in the impregnation tub and the impregnation was carried out in the same ways as in Example 1. As the treatment liquor, a mixture of MMA with styrene(St) in a mixing ratio of 1 was used adding 1.5% of BPO. The weight after the impregnation was 5142.5 g and 1012.5 g of treatment liquor into the grindstone.

The weight when taken out after the polymerization was 4940 g which corresponded to 810 g as the weight of polymer. The conversion ratio through the polymerization was about 80%. To total weight, 810 g of polymer corresponded to 16%. To the voids determined by calculating from the true specific gravity, 61.4% of the voids were to be filled on the average. However, observing the surface of section with optical microscope, polymer was filled rich in the surface layer and the amount of filling became poor toward the inner part. The fact that was evident from the results of the observation was that polymer had grown from the wall surface of void pores and the central parts had become void. According to the calculation, remaining voids not filled with polymer amounted to 38.6%. The finish was carried out using the same procedure as in Example 1.

[EFFECTS OF THE INVENTION]

The utility of the conventional vitrified grindstone is summarized as follows:

(1) Almost all are for planing and polishing.

(2) A part was used for the wet pulverization, but the defects such as clogging of the concaves etc. on the surface with organic matters, and the like are pointed out.

The utility of the composite grindstone of the invention is summarized as follows:

(1) Planing and polishing are possible, of course.

(2) Aseptic sanitary pulverization is possible in the food, chemical and medicinal industries.

(3) Dry pulverization is possible.

(4) Fine pulverization of substances of elastic body such as woody and cellulosic materials is possible.

Showing one example with the woody material, this has been difficult to pulverize finely hitherto, but by using the composite grindstone, a yield of more than 80% could be obtained with a particle size of less than 10 microns. As a remarkable characteristic, it became evident from the results of X-ray diffraction analysis that, in the case of the ordinary pulverization, the crystalline region of woody material was destroyed to become amorphous, whereas, in the case of using composite grindstone, the particle size could be made fine without the destruction of the crystals.

In addition to the above, when using super colloid mill with the built-in composite grindstone, the anxiety of destruction can be taken away at the time of operation and overall super fine milling can be done under heavy pressure. Therefore, the screening of powders in millimicron scale becomes necessary resulting in the improvement of productivity.

These benefits were confirmed to originate from that, to the composite vitrified grindstone used vitrified grindstone as a starting material, the abrasion resistance and the improvement in the durability contributed most significantly, since polymer was helpful for the keeping and the stabilization of grains and the binding degree became excellent.

In the following, comparison of the conventional goods with those of the invention was summarized in a table.

Comparative endurance test of the grindstone of the invention and the conventional vitrified grindstone

| Vitrified grindstone | Grindstone of the invention |
|---|---|
| (1) There arises violent dispersion between respective products. | (1) The dispersion between products can be solved since uniform composition is obtained through the chemical reaction of filling polymer and the process. |
| (2) Resistance to thermal compressibility is inferior by the reason why the using method of the plane of grindstone is out of common sense as a rule. | (2) Strong resistance to pressure. |
| (3) Abrasion is violent due to the dropping out phenomenon in the scope of experiments. In particular, the phenomenon is remarkable at the time of pulverization of substances of high hardness. | (3) Abrasion resistance. Abrasion resistance is superior due to the prevention of dropping out of grains since grains are stabilized constantly and there exist no voids. |
| (4) Durability and resistance to high temperature are poor. | (4) Durability and, in particular, resistance to high temperature under high pressure loading are excellent. |
| (5) Cracking, damage and scattering are apt to occur. | (5) There are entirely no cracking, damage and scattering. |
| (6) Milling ability of grindstone, that is, an ability to make substances super fine particles is poor. This performance is about one third of that of right-hand one. | (6) Milling ability of grindstone, that is, an ability to make substances super fine particles is excellent. This performance is 2.5 to 3 times of that of left-hand one. |

The experimental method and result of pulverization carried out by the use of Masscolloider fitted up composite grindstone with MMA polymer are as follows: As shown in FIGS. 3(A) and 3(B) and FIGS. 4(A) and 4(B), grindstone-polymer composites of the invention were used for stator grindstone and rotor grindstone. The revolutionary grinder is possible to slide up and down freely by the metal fittings of adjusting handle and, by adjusting the clearance so as the particle size of product to fit to one desirable for the pulverizing raw material, extremely stabilized super fine particles which do not need the screening operation could be produced continuously over a long period of time to obtain excellent result.

What is claimed is:

1. A grindstone-polymer composite for a super colloid mill characterized in that, in the inner void pores of a porous vitrified grindstone for a super colloid mill, thermoplastic and thermosetting polymers are allowed to grow and to fill up the wall surface of the void pores within a range of 30 to 60% of total volume of void pores in said grindstone so as 70 to 40% of void pores in the grindstone for super colloid mill remain and the volume fraction Vp thereof lies within a range of 0.09 to 0.21.

2. The grindstone-polymer of claim 1, wherein the polymer comprises polymethylmethacrylate.

3. The grindstone-polymer composite of claim 2, wherein the polymethylmethacrylate is mixed with styrene.

* * * * *